United States Patent [19]

Ostman

[11] Patent Number: 5,317,595
[45] Date of Patent: May 31, 1994

[54] RAPIDLY ADAPTABLE CHANNEL EQUALIZER

[75] Inventor: Kjell Ostman, San Diego, Calif.

[73] Assignee: Nokia Mobile Phones Ltd., Helsinki, Finland

[21] Appl. No.: 907,693

[22] Filed: Jun. 30, 1992

[51] Int. Cl.$^5$ .......................... H03H 7/30; H03H 7/40
[52] U.S. Cl. .......................................... 375/14; 375/12
[58] Field of Search .................. 375/4, 12, 13, 14, 15, 375/16

[56] References Cited

U.S. PATENT DOCUMENTS

| | | | |
|---|---|---|---|
| 4,021,738 | 5/1977 | Gitlin et al. | 375/14 |
| 5,068,873 | 11/1991 | Murakami | 375/13 |

FOREIGN PATENT DOCUMENTS 2225883A 6/1990 United Kingdom .

Primary Examiner—Curtis Kuntz
Assistant Examiner—Duane Kobayashi
Attorney, Agent, or Firm—Perman & Green

[57] ABSTRACT

A method for use in a digital data transfer apparatus, such as a radio telephone (10), that includes an adaptive equalizer, such as an adaptive filter (32), for receiving, correcting, and outputting data symbols. The method determines correction coefficients for the adaptive equalizer and includes a first step of, for every data symbol output by the adaptive equalizer, maintaining a first matrix R that is a NxN channel correlation matrix and a second matrix P that is a N×1 cross correlation vector between a received signal and a transmitted symbol. The method includes a second step of, for every $k^{th}$ symbol output by the adaptive equalizer, determining a set of correction coefficients (C) for the adaptive equalizer based upon the matrices R and P. A third step of the method applies the set of determined correction coefficients to the adaptive equalizer so as to optimally correct a subsequently received data symbol. The correction coefficients are calculated with an inverse matrix of the channel correlation matrix. As a result, the correction coefficients are, in principle, optimal.

10 Claims, 2 Drawing Sheets

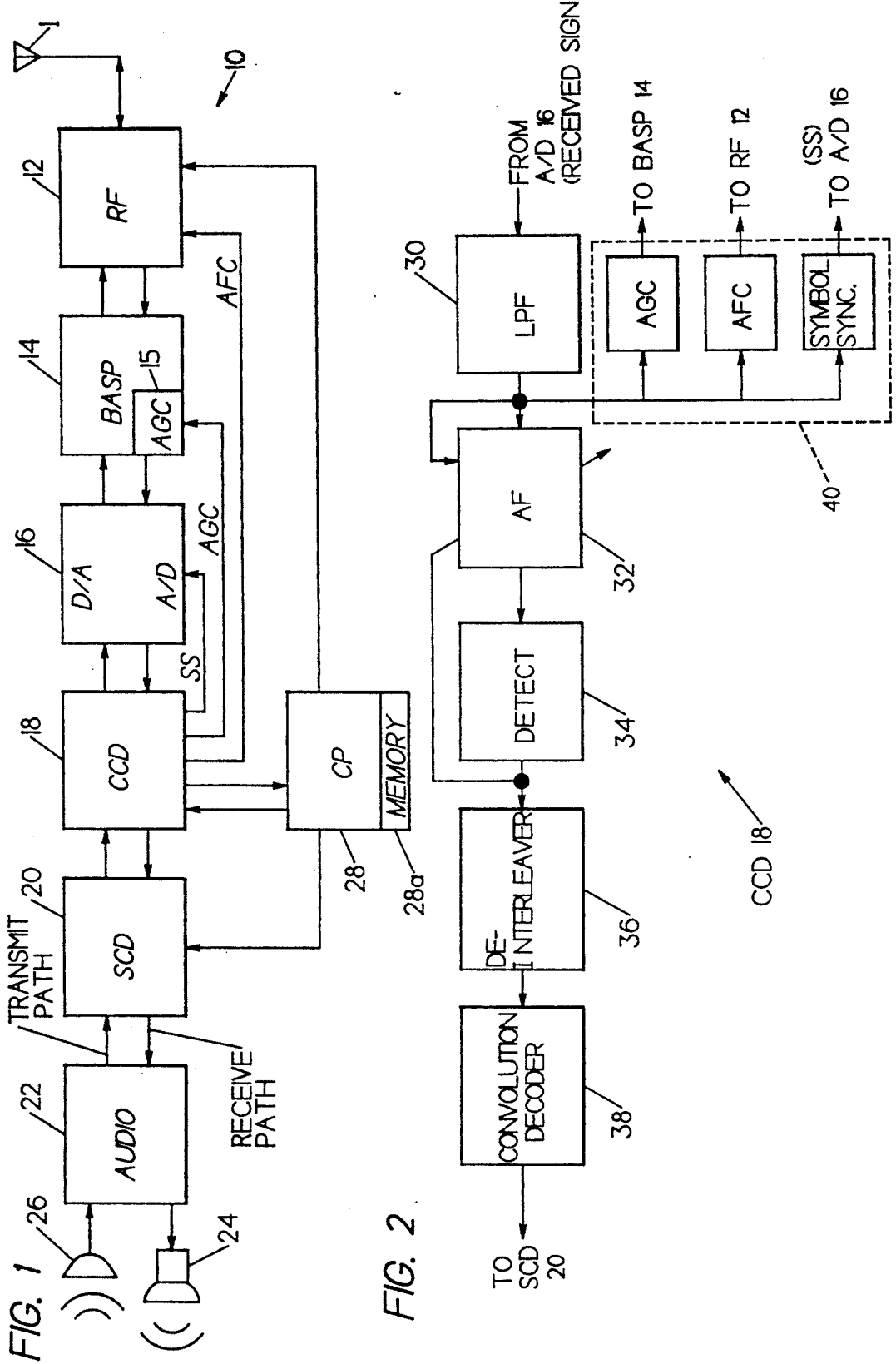

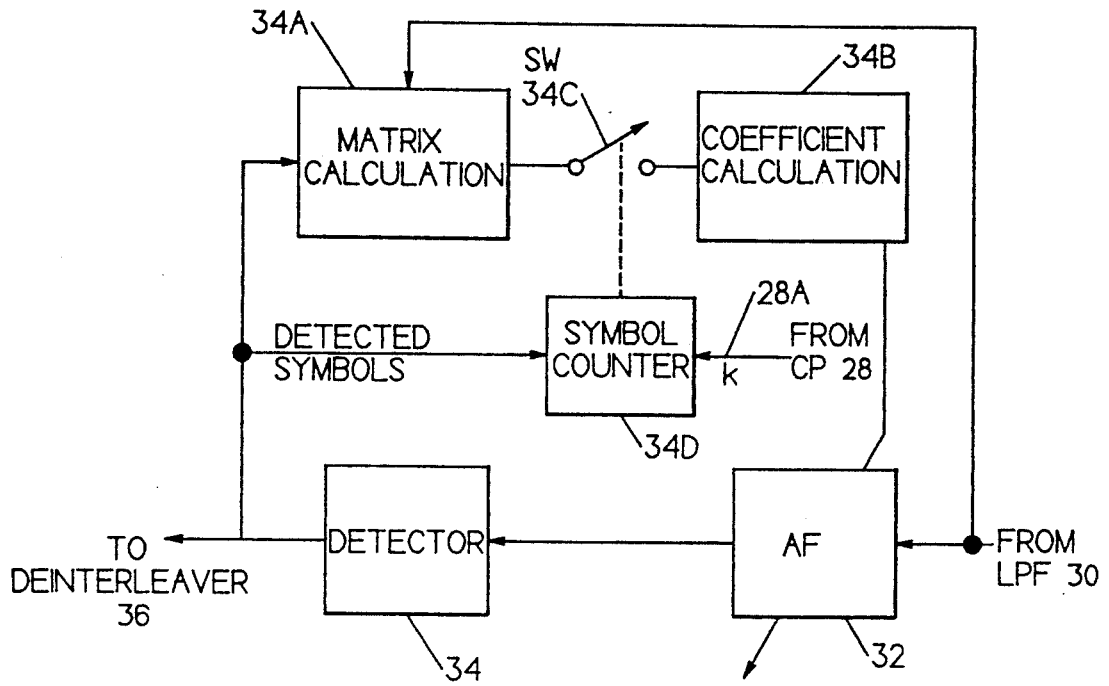

RAPIDLY ADAPTABLE CHANNEL EQUALIZER

FIELD OF THE INVENTION

This invention relates generally to digital data transmission and reception equipment and, in particular, to methods and apparatus for operating an adaptive channel equalizer in such equipment.

BACKGROUND OF THE INVENTION

High baudrate data transmission may generally encounter intersymbol interference (ISI), where subsequent symbols interfere with or overlap one another, making reliable reception difficult or even impossible. The ISI might arise from amplitude or phase distortion, or in the case of digital radio communication, from multipath propagation.

The mentioned types of distortion are linear and may hence be combatted with a channel equalizer. Typically this equalizer is implemented as a tapped delay line, finite impulse response filter, where the taps or coefficients are adjustable, thus making it possible to adjust the filter characteristics.

There are a number of methods for determining the coefficients for a channel equalizer. It is known that an optimal equalizer can be obtained from a solution of the matrix equation:

$$RC = P, \qquad (1)$$

where C is a N×1 vector in which the elements are the equalizer coefficients, R is a NxN channel correlation matrix, and P is a N×1 cross-correlation vector of samples received and symbols sent.

In devices typically employing adaptive equalizers, such as data modems, it is found that the value N is required to be large. As a result, a direct solution of Equation (1) to obtain an optimal equalizer requires a large amount of calculation capacity. However, in that the required equalizer adaptability is generally minimal, relatively simple iterative methods, such as a Least Mean Squared (LMS) technique, can be employed for solving for suboptimal equalizer coefficients.

When optimal equalizer coefficients are desired, as opposed to suboptimal equalizer coefficients, it has been known to solve Equation 1 iteratively or recursively by RLS or Kalman algorithms. However, these algorithms, in their basic form, suffer from a sensitivity to a representation accuracy (number of bits) of the numbers used in the calculation. Unfortunately, decreasing the sensitivity also rapidly increases the requirement for greater calculation capacity.

In addition, all of the known iterative methods are carried out each time a data symbol is received, otherwise the equalizer adaptability is adversely affected.

It is known that a direct solution of Equation 1 may be accomplished by inverting the matrix R and multiplying the matrices $R^{-1}$ and P, or by solving the equation group formed by the matrices, of which the latter is a more efficient approach.

It is an object of this invention to provide an improved method, and apparatus for accomplishing the method, for updating correction coefficients for an adaptive equalizer.

SUMMARY OF THE INVENTION

The foregoing and other problems are overcome and the object of the invention is realized by a method for implementing an adaptive equalizer. The method of the invention exhibits an optimal adaptability, and is also insensitive to a number of bits employed for representing numbers used in a calculation. The method also provides a reduced calculation requirement, without a corresponding reduction in the equalizer performance.

In the method according to the invention the adaptive equalizer coefficients are calculated with an inverse matrix of a channel correlation matrix. As a result, the coefficients are, in principle, optimal. The adaptation occurs such that a channel correlation matrix is maintained or updated for each received symbol, while the correction coefficients are updated only for every $k^{th}$ received symbol. In that the method inverts the correlation matrix, and in that the method also calculates the equalizer coefficients with a frequency that is less than a frequency at which symbols are received, the calculation loading is considerably reduced over the known approaches described previously.

More particularly, there is disclosed a method for use in a digital data transfer apparatus, such as a radio telephone, that includes an adaptive equalizer, such as an adaptive filter, for receiving, correcting, and outputting data symbols. The method determines correction coefficients for the adaptive equalizer and includes a first step of, for every data symbol output by the adaptive equalizer, maintaining a first matrix R that is a N×N channel correlation matrix and a second matrix P that is a N×1 crosscorrelation vector between a received signal and the transmitted symbols. The method includes a second step of, for every kth symbol output by the adaptive equalizer, determining a set of equalizer coefficients (C) for the adaptive equalizer based upon the matrices R and P. A third step of the method applies the set of determined correction coefficients to the adaptive equalizer so as to optimally correct a subsequently received data symbol.

BRIEF DESCRIPTION OF THE DRAWING

The above set forth and other features of the invention are made more apparent in the ensuing Detailed Description of the Invention, when read in conjunction with the attached Drawing, wherein:

FIG. 1 is block diagram of a digital radio telephone that includes a channel coder/decoder that is constructed and operated in accordance with the invention;

FIG. 2 is a block diagram of the decoder portion of the channel coder/decoder of FIG. 1;

FIG. 3 is a more detailed block diagram of the channel coder/decoder, illustrating an adaptive filter and a detector used with correlation matrix and coefficient determination blocks; and FIG. 4a illustrates the N×N channel correlation matrix R, while FIG. 4b illustrates a N×N matrix U that maintains the matrices S and D.

DETAILED DESCRIPTION OF THE INVENTION

There are a number of known methods for solving Equation 1, such as Gauss's substitution, Seidel's and Jordan's iteration methods, and Crouch's partition. Another method for solving an equation group, attributed to Cholesky and described in detail below, is considered to be well suited for use in a radio telephone application, and is thus a presently preferred technique. It should be realized, however, that the teaching of the invention is not limited for use with only radio telephone equipment, nor is the teaching of the invention limited for use with only the solution approach attributed to Cholesky. The Cholesky method is described in the text "Digital Communication" by John G. Proakis, second edition, published by McGraw-Hill, pages 692-693.

Referring to FIG. 1, there is shown an overall simplified block diagram of a digital radio telephone 10. In the ensuing description, reference is made only to the reception path of the signal, although it should be realized that approximately the same signal processing occurs in the transmission path, but in a reverse order.

An antenna 1 provides an input to a radio frequency (RF) block 12 which down-converts a received RF signal from an assigned frequency, in one or more steps, to a frequency low enough (preferably baseband) to be digitally processed. In addition, the RF block 12 also accomplishes necessary channel filtering.

A baseband analog signal processing block (BASP) 14 includes an automatic gain circuit (AGC) 15, and performs symbol synchronization and baseband filtering. The output of the BASP 14 is applied to an analog to digital converter (A/D) 16.

A channel coder/decoder (CCD) 18 receives the digital representation of the synchronized and filtered signal and determines channel correction coefficients for an adaptive equalizer, as will be described in detail below.

A speech coder/decoder (SCD) 20 converts the bits received from the CCD 18 into a u-law coded Pulse Code Modulated (PCM) signal, which is then expanded and converted to an analog signal by an audio block (AUDIO) 22. The output of the AUDIO block 22 is a final speech signal that is output by a loudspeaker 24. A microphone 26 is also coupled to the AUDIO block 22 and provides an analog representation of a user's speech thereto. The user's speech is then passed through the Transmit path, in a manner opposite to that described above, to be eventually transmitted from the antenna 1.

A control processor (CP) 28 is employed to assign the RF 12 and the CCD 18 to the selected channel, to manage the required protocol between the mobile station 10 and a base station (not shown), and to manage a required user interface. The CP 28 includes or is coupled to a memory 28a that stores instructions and data, including the various matrices described in detail below.

FIG. 2 is block diagram that illustrates in greater detail the constituent components of the CCD 18. It should be realized that in some embodiments of the invention that more or less than the number of components shown in FIG. 2 may be employed.

The input signal from the A/D 16 is lowpass filtered by block LPF 30 and is then applied to an adaptive filter (AF) 32. At the output of the AF 32 is a detector (DETECT) 34, wherein a most likely symbol from the signal constellation and the symbol's corresponding bit(s) are detected. As employed herein, a symbol is considered to be a signal amplitude and phase that is selected from a modulation signal constellation. The detected symbol, together with an unequalized signal, is employed to update the coefficients of the AF 32. The detected bits are deinterleaved (Block 36) and convolutionally decoded (Block 38) before being passed to the SCD 20 of FIG. 1. The operation of Blocks 36 and 38 is conventional, and will not be described in further detail.

The receiver furthermore generally includes a support block having an automatic gain control (AGC), automatic frequency control (AFC) and symbol synchronization circuits that operate in a conventional manner. The output of the symbol synchronization circuit is employed to vary the sampling rate of the A/D 16.

FIG. 3 is a block diagram showing in greater detail the Detector 34 and the AF 32. In addition, there is shown a Matrix Calculation block 34A, which operates for every symbol, and a Coefficient Calculation block 34B, which is switchably coupled to an output of the Matrix Calculation block 34A through a switch (SW) 34C.

It should be noted that all described blocks may be implemented with a digital signal processor (DSP), and not with discrete circuit elements. For a DSP embodiment the Switch 34C is understood to be a logical, as opposed to a physical, switching device.

In accordance with the invention, SW 34C is driven by a counter 34D so as to momentarily close once every k symbols so as to couple the output of the Matrix Calculation block 34A to the input of the Coefficient Calculation block 34B. As a result, the AF 32 coefficients are updated once every k symbols, while the Matrix calculations are executed for every symbol. The result is a nearly optimal AF 32 coefficient update with a significantly reduced computational load, as compared to the conventional techniques described above.

The various calculations performed by the Matrix Calculation block 34A and the Coefficient Calculation block 34B are now described in detail.

In the method according to the invention at least once per symbol a sampled signal is received, after which the matrices R and P are maintained by the Matrix Calculation block 34A, once per symbol, according to the following equations:

$$R(n+1) = r \times R(n) + X(n) \times X(n)^T \tag{2}$$

$$P(n+1) = r \times P(n) + d(n) \times X(n), \tag{3}$$

where X is a vector formed by the samples received. The term d(n) is the symbol transmitted from a remote transmitter, typically a base station. The value of the transmitted symbol is either known beforehand, such as during an AF 32 training phase when a synchronizing symbol preamble is received, or is a detected symbol received during a tracking phase. The term r has a value in the range of $0 < r \leq 1$, n is a time index, and $^T$ indicates a transpose of a matrix.

It is noted that in a data transfer application R is symmetric, that is $R = R^H$, where $^H$ indicates transpose and complex conjugate. Thus, the entire R matrix need not be maintained, but only the upper or lower triangle matrix portion thereof, in addition to the diagonal. As a result, the number of elements of the matrix R that must be maintained is considerably smaller than the original number of elements.

After updating the matrices R and P according to formulas 2 and 3, the following matrix equation is solved by the Coefficient Calculation block 34B, $$R \times C = P, \tag{4}$$

preferably with Cholesky's method, described below, in order to obtain new equalizer coefficients. Cholesky's method is presently preferred in that it is a non-iterative, non-recursive technique and, thus, reduces the sensitivity to the number of bits employed for representing numbers.

In that the latter operation (Equation 4) requires significantly more calculation capacity than the former operation (Equations 2 and 3), and because the former operation collects all of the existing information of the received signal; in the method according to the invention, the latter operation is accomplished less frequently than a frequency at which symbols are received. That is, the latter operation is performed once every k symbols, where $k \geq 2$.

In this manner, the equalizer coefficients that are applied to the AF 32 are always optimal when new coefficients are calculated for every $k^{th}$ symbol, and the intermediate k, k=1.., symbols are corrected with a suboptimal equalizer. However, the equalizer adaptability is not adversely affected, so long as all the symbols d(n) can be accurately identified.

The value of k is preferably chosen such that symbol identification succeeds with a sufficient probability so that the audio signal is not noticeably degraded. As was stated, k is equal to or greater than two. For some applications it may be preferred to permanently fix or hardwire the value of k to some value that is equal to two or greater.

Alternately, the value of k may be varied during operation by the CP 28 over a data path 28A to counter 34D. The value of k is made a function of a detected bit error rate (BER) so as to maintain k at a value that provides an acceptable BER for a given set of transmission and reception conditions.

Cholesky's method for solving a group of equations, which is a presently preferred technique for implementing the Coefficient Calculation block 34B, is as follows.

STEP A

As seen in FIG. 4a, the matrix R is partitioned into three matrices S, D, and $S^H$ so that $$R = S \times D \times S^H, \quad (5)$$

where S is a triangular matrix of R, such as the lower triangular matrix, and D is a diagonal matrix of R. The partition is carried out according to the following formulas:

$$D(1) = R(1,1) \quad (6)$$

$$S(i,j) = \left( R(i,j) - \sum_{k=1}^{j-1} S(i,k)D(k)S(j,k) \right) / D(j), \quad (7)$$

where $1 \leq j \leq i-1$ and $2 \leq i \leq N$, and $$D(i) = R(i,i) - \sum_{k=1}^{j-1} S(i,k)S(i,k)D(k), \quad (8)$$

where $2 \leq i \leq N$

STEP B

Next, the matrix $Y = D \times S^H \times C$ is defined and the following group of equations:

$$S \times Y = P \quad (9)$$

is solved with the following formulas:

$$Y(1) = P(1), \text{ and} \quad (10)$$

$$Y(i) = P(i) - \sum_{j=1}^{i=1} S(i,j)Y(j), \quad (11)$$

where $2 \leq i \leq N$.

STEP C

Next, the set of equalizer coefficients C are determined from the following group of equations:

$$S^H \times C = D^{-1} \times Y \quad (12)$$

with the following formulas:

$$C(N) = Y(N)/D(N), \text{ and} \quad (13)$$

$$C(i) = Y(i)/D(i) - \sum_{j=i+1}^{N} S(j,i)c(j), \quad (14)$$

where $1 \leq i \leq N-1$.

For minimizing a memory requirement, and for facilitating memory addressing, a $N \times N$ matrix U may be defined, as shown in FIG. 4b, in which the matrices S and D are maintained in the following form:

$$U = S \times D - D + D^{-1} + S^H - I, \quad (15)$$

where I is a diagonal unit matrix. This matrix storage scheme enables in-place factorization. It is noted that the matrix Y can physically occupy the same memory locations as the matrix C so as to further minimize memory 28a requirements.

While the invention has been particularly shown and described with respect to a preferred embodiment thereof, it will be understood by those skilled in the art that changes in form and details may be made therein without departing from the scope and spirit of the invention.

What is claimed is:

1. For use in a digital data transfer apparatus that includes an adaptive equalizer means for receiving, correcting, and outputting symbols, a method of determining correction coefficients for the adaptive equalizer means that includes the steps of:

for every symbol output by the adaptive equalizer means, maintaining a first matrix R that is a $N \times N$ channel correlation matrix and a second matrix P that is a $N \times 1$ crosscorrelation vector between a received signal and transmitted symbols;

for every $k^{th}$ symbol output by the adaptive equalizer means, where k is equal to or greater than two, determining a set of equalizer coefficients (C) for the adaptive equalizer means based upon matrices R and P; and applying the set of determined correction coefficients to the adaptive equalizer means so as to correct a subsequently received data symbol.

2. A method as set forth in claim 1 wherein the step of maintaining includes the steps of operating on the matrix R in accordance with the expressions:

$$R(n+1) = r \times R(n) + X(n) \times X(n)^T, \text{ and}$$

$$P(n+1) = r \times P(n) + d(n) \times X(n),$$

where X is a vector formed by received symbol samples, d(n) is a symbol, the value of which is either known beforehand or is detected, r has a value in the range of $0 < r \leq 1$, n is a time index, and $T$ indicates a transpose of a matrix.

3. A method as set forth in claim 2 wherein only the diagonal matrix D and either an upper triangular matrix or a lower triangular matrix of the matrix R is maintained.

4. A method as set forth in claim 1 wherein the step of determining include a step of:

solving the expression $$RC = P$$

by the steps of,

STEP A:

partitioning the matrix R into three matrices S, D, and $S^H$ so that $$R = S \times D \times S^H,$$

where S is a triangular matrix of R and D is the diagonal matrix of R, the step of positioning including a step of solving the formulas:

$$D(1) = R(1,1)$$

$$S(i,j) = \left( R(i,j) - \sum_{k=1}^{j-1} S(i,k)D(k)S(j,k) \right) / D(j),$$

where $1 \leq j \leq i-1$ and $2 \leq i \leq N$, and $$D(i) = R(i,i) - \sum_{k=1}^{j-1} S(i,k)S(i,k)D(k),$$

where $2 \leq i \leq N$;

STEP B:

defining a matrix $Y = D \times S^H \times C$, and solving the group of equations:

$$S \times Y = P$$

in accordance with the formulas:

$$Y(1) = P(1), \text{ and}$$

$$Y(i) = P(i) - \sum_{j=1}^{i-1} S(i,j)Y(j),$$

where $2 \leq i \leq N$; and

STEP C:

determining the set of correction coefficients C in accordance with:

$$S^H \times C = D^{-1} \times Y$$

by the use of the formulas:

$$C(N) = Y(N)/D(N), \text{ and}$$

$$C(i) = Y(i)/D(i) - \sum_{j=i+1}^{N} S(j,i)c(j),$$

where $1 \leq i \leq N-1$.

5. A method as set forth in claim 4, and further including a step of defining a NxN matrix U for maintaining the matrices S and D as:

$$U = S \times D - D + D^{-1} + S^H - I,$$

where I is a diagonal unit matrix.

6. A radio telephone comprising:

means for receiving and for transmitting an RF signal that is modulated with digital data representative of speech;

coding and decoding means for applying and extracting the digital data as data symbols, said coding and decoding means including, for a receive path, adaptive equalizer means for receiving, correcting, and outputting data symbols; and detector means for detecting the data symbols output by said adaptive equalizer means, said detector means including means for determining correction coefficients for the adaptive equalizer means, said correction coefficient determining means including means, responsive to every data symbol output by said adaptive equalizer means, for maintaining a first matrix R that is a N×N channel correlation matrix and a second matrix P that is a N×1 cross-correlation vector between a received signal and transmitted symbols, said correction coefficient determining means further being responsive to every $k^{th}$ symbol output by said adaptive equalizer means for determining a set of correction coefficients (C) for the adaptive equalizer means based upon the N×N channel correlation matrix R, said detector means having an output coupled to an input of said adaptive equalizer means for applying the set of determined correction coefficients to the adaptive equalizer means so as to optimally correct a subsequently received data symbol, wherein k is equal to or greater than two.

7. A radio telephone as set forth in claim 6 wherein said correction coefficient determination means operates on the matrix R in accordance with the expressions:

$$R(n+1) = r \times R(n) + X(n) \times X(n)^T, \text{ and}$$

$$P(n+1) = r \times P(n) + d(n) \times X(n),$$

where X is a vector formed by received data symbol samples, d(n) is a data symbol sent, the value of which is either known beforehand or is detected, r has a value in the range of $0 < r \leq 1$, n is a time index, and $T$ indicates a transpose of a matrix.

8. A radio telephone as set forth in claim 7 and further including memory means for storing the diagonal matrix D and either an upper triangular matrix or a lower triangular matrix of the matrix R.

9. A radio telephone as set forth in claim 6 wherein said correction coefficient determination means solves an expression $RC = P$ by a first operation of:

partitioning the matrix R into three matrices S, D, and $S^H$ so that $$R = S \times D \times S^H,$$

where S is a triangular matrix of R and D is the diagonal matrix of R, the operation of partitioning including the operations of solving the formulas:

$$D(1) = R(1,1)$$

$$S(i,j) = \left( R(i,j) - \sum_{k=1}^{j-1} S(i,k)D(1k)S(j,k) \right)/D(j),$$

where $1 \leq j \leq i-1$ and $2 \leq i \leq N$, and $$D(i) = R(i,i) - \sum_{k=1}^{j-1} S(i,k)S(i,k)D(k),$$

where $2 \leq i \leq N$;
by an operation of defining a matrix $Y = D \times S^H \times C$, and solving the group of equations:

$$S \times Y = P$$

in accordance with the formulas:

$Y(1) = P(1)$, and $$Y(i) = P(i) - \sum_{j=1}^{i-1} S(i,j)Y(j),$$

where $2 \leq i \leq N$; and
by an operation of determining the set of correction coefficients C in accordance with:

$$S^H \times C = D^{-1} \times Y$$

by the use of the formulas:

$C(N) = Y(N)/D(N)$, and $$C(i) = Y(i)/D(i) - \sum_{j=i+1}^{N} S(j,i)C(j),$$

where $1 \leq i \leq N-1$.

10. A radio telephone as set forth in claim 9 and further including memory means for storing a N×N matrix U so as to maintain the matrices S and D as:

$$U = S \times D - D + D^{-1} + S^H - I,$$

where I is a diagonal unit matrix.

* * * * *

UNITED STATES PATENT AND TRADEMARK OFFICE
CERTIFICATE OF CORRECTION

PATENT NO. : 5,317,595
DATED : May 31, 1994
INVENTOR(S) : Ostman

It is certified that error appears in the above-indentified patent and that said Letters Patent is hereby corrected as shown below:

In column 7, line 24, positioning should read "partitioning".

In column 7, the last equation should read as follows:

$$C(i) = Y(i)/D(i) - \sum_{j=i+1}^{N} S(j,i)C(j),$$

In column 9, the first equation should read as follows:

$$S(i,j) = (R(i,j) - \sum_{k=1}^{j-1} S(i,k)D(k)S(j,k))/D(j),$$

Signed and Sealed this

Sixteenth Day of August, 1994

BRUCE LEHMAN

*Attest:*

*Attesting Officer*     *Commissioner of Patents and Trademarks*